United States Patent
Kaempgen et al.

[15] 3,653,948
[45] Apr. 4, 1972

[54] PROCESS AND APPARATUS FOR COMPRESSING STRING-FORMING POLYMER SUBSTANCES BY MECHANICAL VIBRATION

[72] Inventors: Dieter Kaempgen, Wiesbaden-Freudenberg; Willi J. Schmidt, Hahn/Taunus; Walter Seifried, Wiesbaden-Biebrich, all of Germany

[73] Assignee: Kalle Aktiengesellschaft, Wiesbaden-Biebrich, Germany

[22] Filed: Nov. 27, 1968

[21] Appl. No.: 779,551

[30] Foreign Application Priority Data

Nov. 30, 1967 Germany..................P 17 04 777.7

[52] U.S. Cl...............117/65.2, 117/63, 118/57, 118/120, 118/126, 117/120, 156/73
[51] Int. Cl..............................................B44d 1/44
[58] Field of Search............117/62, 63, 65.2, DIG. 8, 120; 118/57, 120, 126; 156/73

[56] References Cited

UNITED STATES PATENTS

| | | | |
|---|---|---|---|
| 3,449,880 | 6/1969 | Bailey | 156/73 |
| 3,131,104 | 4/1964 | Korn | 156/73 |
| 2,480,501 | 8/1949 | Moore | 156/73 |
| 2,537,509 | 1/1951 | Camp | 156/73 |
| 3,305,392 | 2/1967 | Britt | 117/120 |
| 3,439,392 | 4/1969 | McNab | 156/73 |
| 3,034,927 | 5/1962 | Fairclough et al. | 117/65.2 |
| 3,238,055 | 3/1966 | Brightwell | 117/63 |
| 3,424,604 | 1/1969 | Fukushima et al. | 117/63 |
| 3,494,781 | 2/1970 | Knibbe et al. | 117/63 |
| 3,100,721 | 8/1963 | Holden | 117/135.5 |
| 3,143,436 | 8/1964 | Dosman | 117/65.2 |
| 3,190,765 | 6/1965 | Yuan | 117/135.5 |
| 3,170,766 | 6/1965 | Yuan | 117/135.5 |
| 3,284,274 | 11/1966 | Hulslanden et al. | 117/135.5 |
| 3,348,963 | 10/1967 | Fukushima et al. | 117/135.5 |
| 3,369,925 | 2/1968 | Matsushita et al. | 117/63 |
| 3,403,046 | 9/1968 | Schwalhe et al. | 117/65.2 |
| 2,741,111 | 4/1956 | Smith | 68/175 |

*Primary Examiner*—Murray Katz
*Assistant Examiner*—M. Sofocleous
*Attorney*—James E. Bryan

[57] ABSTRACT

A porous sheet of material is first passed through an impregnation bath containing a polymer solution and then through a coagulation bath which produces string-forming polymers physically incorporated in the pores of the sheet. The sheet is then passed between a relatively rigid vibrating means engaging one side thereof and a resilient pressure means engaging the opposite side thereof, the resilient pressure means holding the sheet of material in contact with the vibrating means. The sheet is subsequently dried.

1 Claim, 3 Drawing Figures

Patented April 4, 1972
3,653,948
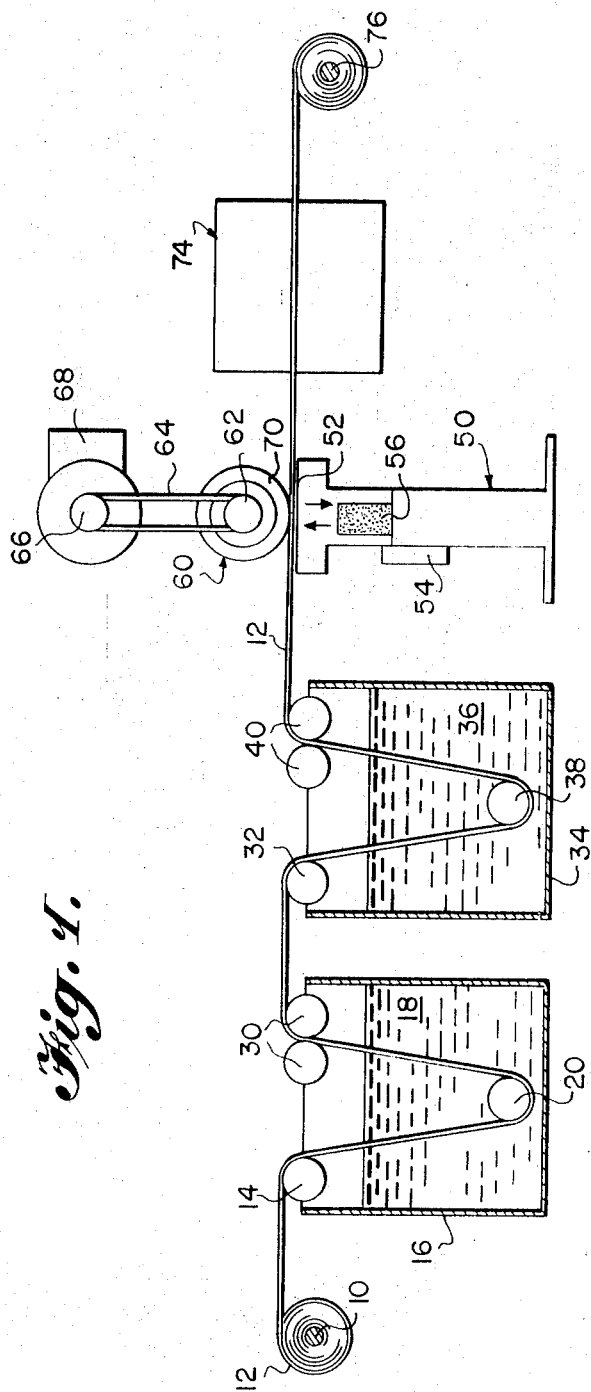
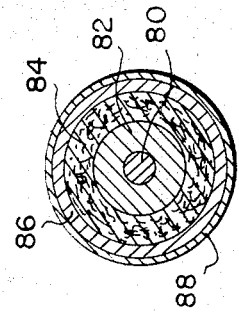
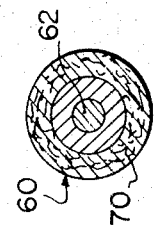
INVENTORS
DIETER KAEMPGEN,
WILLI J. SCHMIDT &
WALTER SEIFRIED
BY Bryan and Bertram
ATTORNEYS

PROCESS AND APPARATUS FOR COMPRESSING STRING-FORMING POLYMER SUBSTANCES BY MECHANICAL VIBRATION

Copending application Ser. No. 693,742, filed Dec. 27, 1967, and now abandoned discloses a process for the preparation of porous products by impregnating bodies formed from substances having a fibrous structure and/or a foamed structure, with solutions and/or dispersions of a high-polymer composition, and then solidifying same. In this process, open-pore materials which return to their original shape after compression are impregnated with solutions or dispersions of high-polymer string-forming compositions. The high-polymer compositions are converted into the string-forming state by means of heat and/or precipitating agents, and the body is then exposed to a compressive force. The body is then solidified in a known manner after the compressive force is removed.

The present invention enables the string-forming polymers physically incorporated in the pores of a sheet of porous fabric or fleece material to be compressed by a vibrating means. The sheet of material incorporating the string-forming polymers is passed between a vibrating means having a relatively rigid surface in engagement with one side of the sheet of material, the opposite side of the sheet of material being engaged by pressure means including a resilient deformable surface. This resilient surface exerts a pressure on the sheet of material to maintain the sheet of material in contact with the surface of the vibrating means as the sheet of material moves past the vibrating means.

The vibrating means has a surface which is sufficiently rigid and hard so that it will transfer the vibrations thereof to the sheet of material in engagement therewith. The vibrating means reciprocates at a rate of from about 10 to about 500 oscillations per second and preferably within the range of about 25 to 100 oscillations per second. The vibrating means has a reciprocatory movement which is approximately perpendicular to the plane and direction of movement of the sheet of material passing adjacent thereto. The pressure means engaging the opposite side of the sheet of material has a resilient deformable surface disposed substantially in alignment with the vibrating means.

The vibrating means may comprise a vibration jack the upper hard rigid surface of which is caused to vibrate by a vibration producer. This vibrating means is supported on rubber buffers. The pressure means is disposed opposite the vibrating means and is spaced from the surface thereof a distance less than the thickness of the porous sheet of material whereby the pressure means ensures that the sheet of material will be maintained in continuous contact with said vibrating means as the sheet of material passes adjacent thereto and will be adequately compressed. The pressure means preferably comprises a roller having a resilient outer surface.

The sheet of material must be compressed to such an extent that the binder particles or string-forming polymers incorporated in the fibrous fleece of the material come into contact with one another. Accordingly, the lower the binder concentration, the greater the pressure required in order to produce the desired contact between the binder particles.

The surface of the vibrating means as well as the surface of the pressure means may also be of such a construction that they can be heated. This is desirable when the high softening point of the polymer substance requires additional heating of the apparatus. In such a case, the resilient surface of the pressure means may be formed of a suitable heat-resistant material such as stone wool, steel wool, glass wool and the like.

The frequency of vibration of the vibrating means should be such that the time interval between strokes thereof is sufficient to allow resilient recovery of the fibrous fleece material.

When the pressure means comprises a roller having a resilient surface thereon for exerting counterpressure on the sheet of material, the rotational speed of the roller may be adjusted such that the speed of the peripheral edge thereof corresponds to the linear traveling speed of movement of the sheet of porous material.

The type and density of the fleece of the porous material influences the optimum string formation of the polymer substance since they influence the recovery forces. It is necessary to provide fibers of the material which extend substantially perpendicular to the plane of the sheet of material since those fibers extending parallel to the plane of the sheet of material do not participate in the recovery of the fleece in response to pressure exerted perpendicular to the sheet of material.

In the drawings,

FIG. 1 is a diagrammatic illustration of the apparatus for carrying out the process of the present invention;

FIG. 2 is a cross section of a pressure means incorporating a resilient surface; and FIG. 3 is a cross section of a pressure means which may be heated.

Referring now to the drawings wherein like reference characters designate corresponding parts throughout the several views, a supply roll 10 is provided with a sheet of porous material 12 wound therearound. The sheet of material 12 is drawn off of roll 10 over a guide roll 14 and thence downwardly into an impregnation bath indicated by reference numeral 16 having a quantity of polymer solution or dispersion disposed therewithin. The sheet of material passes downwardly through the bath about a guide roll 20 and thence upwardly and through a pair of nip rolls 30 which remove any excess of polymer solution or dispersion from the sheet of material.

The sheet of material then passes over a further guide roll 32 and thence downwardly into a coagulation bath 34 having a quantity of suitable bath liquid 36 disposed therewithin. The sheet of material passes around guide roll 38 and thence upwardly and through a pair of nip rolls 40 to remove most of the coagulation liquid.

A vibrating means is indicated generally by reference numeral 50 and may comprise a vibration jack the upper hard rigid surface 52 of which is adapted to be engaged by the sheet of material to transfer its reciprocating movement to the sheet of material. The vibrating means is adapted to reciprocate in the direction indicated by the arrows and is vibrated by a vibration producer 54, the vibrating means being supported on rubber buffer means 56.

The pressure means for applying pressure to one surface of the sheet of material comprises a roller 60 connected for rotation with a pulley 62. The pulley 62 is in turn drivingly connected by means of a belt 64 with a drive pulley 66 driven by a motor 68.

As seen in FIG. 2, the roller 60 includes an annular outer resilient layer of material 70 which is deformable and which is adapted to apply pressure to the upper side of the sheet of material as seen in FIG. 1.

The pressure means in the form of roller 60 constantly urges the sheet of material 12 into engagement with the upper surface 52 of the vibrating means, and this vibrating means reciprocates in a direction which is substantially perpendicular to the plane of the sheet and the direction of movement thereof. The pressure means is disposed substantially opposite to and aligned with the vibrating means.

After the material has passed between the vibrating means and the pressure means, it passes through a drying chamber indicated generally by reference numeral 74. The sheet of material is then wound up on a take-up roll 76.

Referring now to FIG. 3, a modified form of roller is illustrated. As seen in this figure, a pulley 80 is connected for rotation with a roller 82 having an annular layer of steel wool or other thermally insensitive flexible material 84 disposed thereabout. This layer of material 84 is in turn surrounded with thin straps 86, and these straps are surrounded and covered by a fine sieve netting or thin steel band 88. This construction enables the roller to be heated since the components thereof are insensitive to heat.

It will be obvious to those skilled in the art that many modifications may be made within the scope of the present invention without departing from the spirit thereof, and the invention includes all such modifications.

What is claimed is:

1. A process for compressing a sheet of porous material having string-forming polymers physically incorporated in the pores thereof which comprises passing the sheet of porous material through an impregnation zone, then through a coagulation zone, then into a pressure zone and applying vibrating pressure to one surface of the material while resiliently supporting the other surface thereof, and drying the material by heating.

* * * * *